UNITED STATES PATENT OFFICE.

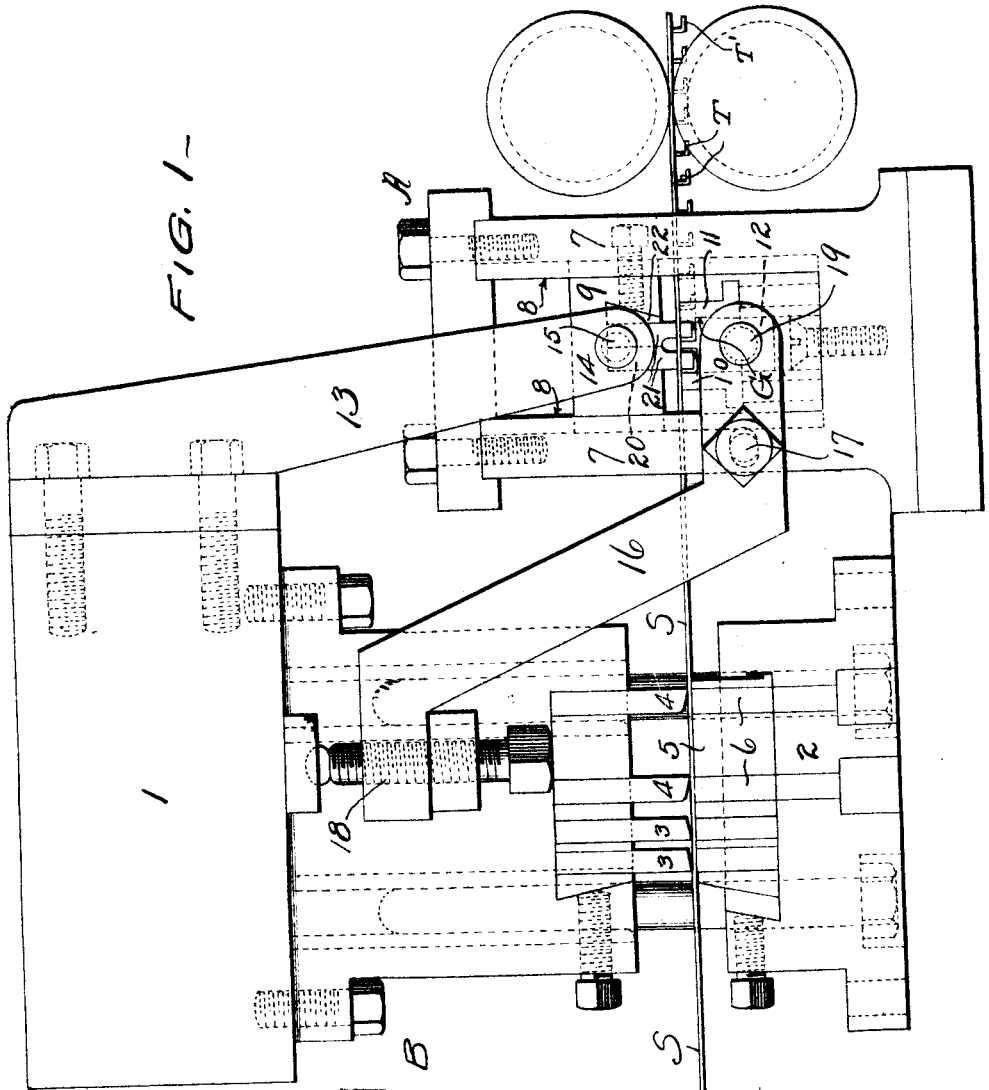
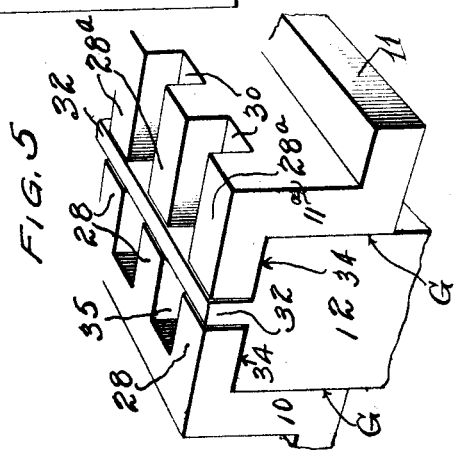

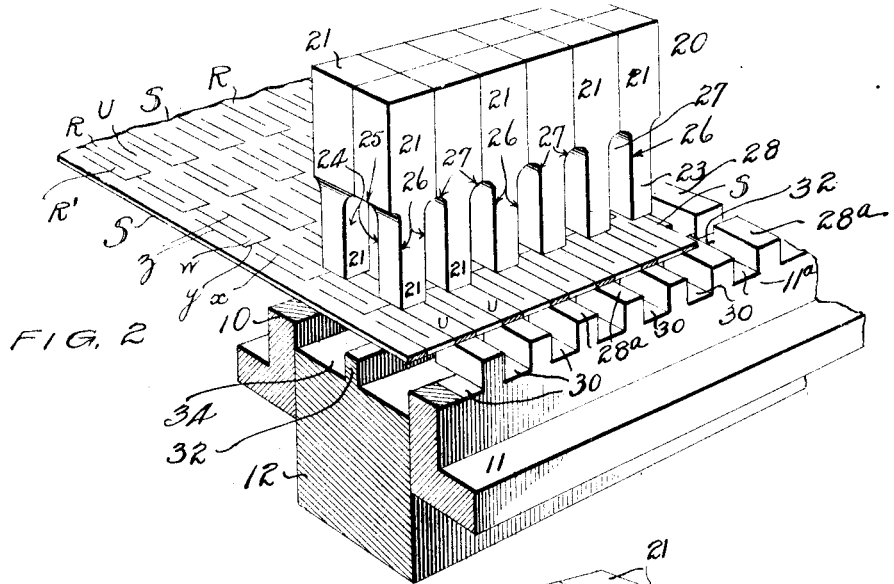

JOSEPH G. HUBBARD AND WILLIAM R. WILSON, OF YOUNGSTOWN, OHIO.

MACHINE FOR MAKING EXPANDED SHEET METAL.

1,163,924.   Specification of Letters Patent.   Patented Dec. 14, 1915.

Application filed July 2, 1915. Serial No. 37,710.

*To all whom it may concern:*

Be it known that we, JOSEPH G. HUBBARD, a citizen of the United States, and WILLIAM R. WILSON, a subject of the King of Great Britain, residing at Youngstown, in the county of Mahoning and State of Ohio, have invented certain new and useful Improvements in Machines for Making Expanded Sheet Metal, of which the following is a specification.

This invention relates to an improvement in machines for making expanded sheet metal, and has for its object to facilitate the operation of such machines in preparing the blank for the final step of expansion.

The present type of devices used in the development of slitted metal sheets of the character, for example, shown and described in the patent to Forsyth, No. 862,897, dated August 13, 1907 are of such construction that they are of limited productive capacity. That is to say, the machinery now employed at one stage of the process to punch or bend down the metal tongues formed by slitting and shearing elements, and thus prepare the metal blank for the final expanding step, is not capable of rapidly producing the desired result. Accordingly, the present invention is intended to provide means whereby the operations involved in the making of the product can be materially speeded.

— More particularly, the invention contemplates a machine involving slitting and shearing elements coördinated with a special bending or punching device, having novel means for bending or displacing the tongues of metal formed by the slitting and shearing elements downwardly at an angle from the flat plane of the sheet in a more rapid and practical manner than heretofore.

With the above and other objects in view which will more readily appear as the nature of the invention is better understood, the same consists in the novel construction, combination and arrangement of parts hereinafter more fully described, illustrated and claimed.

Although the general arrangement and details of the present machine are susceptible of modification, the essential features of the invention are shown in the accompanying drawings, in which—

Figure 1 is an elevation of a machine involving the present invention, and showing the relative relation of the slitting and shearing device to the bending device, together with the means for feeding the uncut sheet into the machine and delivering the prepared sheet from the bending device so that it may be operated upon by expanding devices not shown. Fig. 2 is a detail perspective view of the bender device in its open position. Fig. 3 is a view similar to Fig. 2 with the bender device closed. Fig. 4 is a detail plan view of a metal sheet slitted to be bent by the present bending device. Fig. 5 is a detail perspective view of the anvil and bearing bar assembly.

Similar reference characters designate corresponding parts throughout the several figures of the drawings.

As indicated, the present invention is chiefly centered in the novel construction and arrangement of the so-called bender device which is coördinated with mechanism to slit and shear the metal sheet, and which leaves the same in the proper form to be acted upon by the subsequent expanding devices (not shown).

— The bender device is designated generally by the letter A, and it will be understood that the same operates in connection with a slitting and shearing device designated by B, and arranged as close to the device A as may be practicable to obtain the proper operating connections therebetween.

Illustrating the expanded metal product by the Forsyth Patent No. 862,897, it is to be observed therefrom that the metal sheet S is provided with a plurality of narrow longitudinally slitted sections or rows R composed of a plurality of slitted units R' each including a single central longitudinally disposed slit $x$ and a transverse slit $y$ which extends equally on both sides of its junction with the longitudinal slit $x$. Each unit R' also includes the opposite longitudinal slits $z$ which connect with the ends of the transverse slit $y$ and are disposed in an opposite direction with relation to the slit $x$. Thus, it will be apparent that these units are so formed that the longitudinal slit $x$ of one unit extends into the U-space between the slits $z$ of an adjacent unit, leaving an uncut web portion $w$. Between the slitted rows R are left an uncut portion U which provides a rib in the finished article.

This type of slitted metal sheet is prepared by means of the slitting and shearing device designated B. This preferably includes a reciprocating ram head 1 and a stationary die bed 2 arranged directly beneath the same. The ram head 1 carries a plurality of slitting and shearing punches, which may be of any well known design adapted for this purpose. The knife-like slitting punches 3 are so arranged that they first form the longitudinal slit $x$ in the metal sheet S and as the same continues to pass through the machine, it is operated upon by the rectangular end of the shearing punches 4 which form the slits $y$ and $z$ at the end of the slit $x$, as will be apparent. The stationary die bed 2 is provided with a suitable die block 5 and is also provided with the usual yielding knock-out rake members 6 arranged directly beneath the shearing punches 4 which free the metal tongues from the cutting punches, and thus insure a uniform feed for the sheet S through the machine.

From the foregoing, it will of course be understood that the slitting and shearing device B initially prepares the metal sheet so that it assumes the form shown in Fig. 4, thus rendering the same ready for final treatment by the bending device A.

Referring now to the bending device A, it will be observed more particularly from Fig. 1 that the same essentially includes opposite frame members 7 having a guideway 8 in which is adapted to reciprocate a bender head 9. Directly beneath the bender head 9 and between the frame members 7, there is also located a pair of spaced reversely arranged bearing bars 10 and 11 which are stationary in the bed of the bender device, and provide a guideway G therebetween for a reciprocating anvil member 12.

The operating connections between the devices A and B can be best observed from Fig. 1, and by reference thereto, it will be observed that the reciprocating ram head 1 carries at one side thereof a rigid arm member 13 which has journaled in its lower end 14 a bearing pin 15 carried by the reciprocating bender head 9. This construction, involving the arm 13 and bearing pin 15, is duplicated on the opposite side of the machine so as to give the bender head 9 a uniform reciprocating movement. For the purpose of reciprocating the anvil member 12, to operate in conjunction with the bender head, there is provided a bell crank lever 16, pivoted as at 17 to the frame 7 of the bender device A, and connected at one end as at 18 with the ram head 1, while the other end loosely receives a bearing pin 19 carried by the anvil member 12. Accordingly, when the ram head 1 moves downwardly, the bender head 9 will also move down, while the anvil member 12 will move upwardly. When the ram head moves upwardly, the reverse operation takes place. When the ram head comes down, the bender 9 and anvil 12 are given their working stroke, and when the ram head rises, these parts are returned to their normal position.

Returning to the special features of the bender device, which make it possible to more rapidly prepare the metal sheet for the expanding devices, it will be noted that the bender head 9 carries therewith a bending jaw 20 which is preferably composed of a plurality of bending punches 21 clamped in position by means of a suitable retaining device 22. These bending punches 21 have the adjacent inner faces of their working shanks 23 cut away as at 24, so that when the punches are set up in the jaw, they provide a longitudinally arched central portion 25 for the jaw. The adjacent side faces 26 of these individual punch members 21 are also similarly cut away to provide transverse rib-clearing arches 27. While it is preferable to build this jaw 20 of the individual punch elements 21, it will of course be understood that the same may be made integral so long as the longitudinal arch 25 is preserved, and the plurality of transverse arches 27 are also present. However, as the shanks 23 are liable to become broken during the operation of the machine, it is desirable that individual punch elements be used as shown.

The portion of the bender device beneath the bender head 9 includes the opposite bearing bars 10 and 11 and the reciprocating anvil member 12.

As shown in Fig. 5, bar 10 carries at its upper part a plurality of inwardly extending fingers 28, the intervening portions being cut away to provide the recesses 35 which receive the bending punches 21 in their operating movement. Bar 11 carries similar inwardly extending fingers 28ª except that the cut-away portions are continued through the upright web portion 11ª of the bar to provide the freeway or tongue-clearing spaces 30 to permit the passage of the bent down tongues T of the metal fabric, in addition to the recesses to receive the punches 21 as explained with reference to bar 10. The inner ends of the opposing fingers 28 and 28ª are immediately adjacent the opposite sides of the clamping and spacing rib 32 when in its upper or working position, as hereinafter explained, thus affording continuous bearings for the uncut rib portions U of the sheet.

By reference to Figs. 2 and 3 it will be observed that the reciprocating anvil member 12 is provided with a single centrally disposed upstanding sheet-clamping and spacing rib 32 which extends longitudinally through the length of the anvil 12, and on opposite sides of this rib are the anvil surfaces 31.

It will be observed that fingers 28 and 28ª have been omitted from the exposed ends of 10 and 11 in Figs. 2 and 3 in order disclose the rib 32, the anvil surfaces 34 and the general outline of the anvil member 12.

From the foregoing description, the operation of the machine will be apparent. The metal sheet S is fed into the slitting and shearing device B by means of the feed rolls F, and comes out in the form shown in Fig. 4. It will of course be understood that the sheet S is fed through the device B intermittently, or step by step, so that the slitting and shearing can take place in the proper order. Accordingly, the prepared sheet is advanced into and through the bender device A, between the members 9 and 12 in the same manner. Assuming that the sheet prepared as shown in Fig. 4 has been fed into the machine to such point that the uncut ribs U of the first two units R' thereof span the distance between the opposite bearing bars 10 and 11, it will be apparent that these two units are directly beneath the spaced punch elements 21 of the jaw 20. The machine being in operation, and the ram head 1 of the slitting and shearing device B moving, it will of course be clear that the bender head 9, carrying the bending jaw 20, and the reciprocating anvil member 12 will be actuated through the connections described. That is to say, as the ram head moves down and slits and shears a portion of the metal sheet in the device B, the jaw 20 of the bending head 9 will move downwardly, the anvil member 12 will move upwardly, and the punches 21 will bend down the portion of the metal bounded by the slits $y$, $z$, and a part of the slit $x$ of the following adjacent unit R', and thus form the depending tongues T. This action of the jaw 20 and anvil 12 forms the tongues T, with an angular foot portion T', as shown, and it will be apparent that each time the jaw 20 and anvil 12 come together two tongues are struck down in each row R of the metal sheet. Thus, the sheet is more rapidly prepared than if only one tongue was formed by each operation. When the tongues are being formed from the metal sheet, the uncut rib portions U between the rows R rest upon the bearing bar 10, the fingers 28, the rib 32 and the fingers or ribs 28ᵃ. After the tongues have been formed, the jaw 20 and anvil member 12 recede or separate, so that the longitudinal clamping rib 32 on the anvil 12 will drop below the plane of the bottom edge of the freeway spaces 30 between the fingers or ribs 28ᵃ, thus making it possible for the tongues formed behind the rib 32 to pass freely through the bending device by way of the freeway spaces 30. It is obvious that if the anvil member 12 was not arranged to reciprocate in such manner as to draw the rib 32 down clear of the bottom edges of the freeway spaces 30, the last tongue of each pair formed would engage with the side wall of the rib 32, and thus prevent the sheet from advancing through the bender device. However, this possibility is eliminated by the movement of the jaw 20 and anvil 12 being properly timed to recede previous to the advancing of the sheet in the direction of the arrow shown in Figs. 2 and 3. After a pair of tongues have been struck down from the metal sheet, two more units R' in the original plane of the sheet are advanced into position, and the bending-jaw and anvil member again come together to displace the tongues as shown in the drawings. Thus, it will be apparent that this operation is repeated during the entire working of the machine, rapidly and positively forming the tongues in pairs, economizing time and increasing the capacity of the machine.

From the foregoing, it is thought that the many features and advantages of invention will be readily apparent, and it will of course be understood that minor details of construction may be resorted to without departing from the spirit of the invention or scope of the appended claims.

We claim:

1. A metal working machine comprising a slitting and shearing device, a bender device including oppositely working upper and lower bending elements, and spaced bars forming a guideway for the lower bending element, and also providing supporting and guiding means for the metal sheet being operated upon.

2. A metal working machine comprising a slitting and shearing device and a bender device, said bender device including an upper reciprocal jaw member having a central longitudinally arched portion, and a lower reciprocating anvil member having a single longitudinally arranged upstanding rib and depressed anvil faces at the sides of the rib.

3. A metal working machine comprising a slitting and shearing device and a bender device, said bender device comprising an upper jaw member having a plurality of longitudinally arranged bending elements with a longitudinal arch therebetween, and a lower reciprocating anvil member having a single longitudinally arranged upstanding rim and opposite anvil faces.

4. A metal working machine comprising a slitting and shearing device and a bender device, said bender device including an upper jaw member having a plurality of longitudinally arranged bending elements with a longitudinal arch therebetween, each of said longitudinally disposed bending elements having a plurality of transverse arches, a lower reciprocating anvil member having a single upstanding longitudinal rib coöperating with said longitudinal arch formed between said bending elements, and bearing bars on each side of said reciprocating anvil member, each of said bars having fingers or ribs in alinement with the transverse arches in said upper jaw member.

5. A metal working machine comprising a slitting and shearing device and a bender device, said bender device including an upper jaw member comprising a plurality of longitudinally and transversely spaced bending punch elements, a lower anvil member working in opposition to said upper jaw member, a single longitudinal rib on said anvil member, and bearing bars arranged on opposite sides of said anvil member, each of said bars having spaced fingers or ribs in alinement with the transverse spaces between said bending punches, and the spaces between said fingers or ribs being in alinement with said bending punches.

6. A metal working machine comprising a slitting and shearing device and a bender device, said bender device including an upper jaw member comprising a plurality of longitudinally and transversely spaced bending punch elements, a lower anvil member working in opposition to said upper jaw member, a single longitudinal rib on said anvil member, and bearing bars arranged on opposite sides of said anvil member, each of said bars having fingers or ribs, with tongue clearance spaces therebetween on one of said bars, and means for drawing said reciprocating anvil member downwardly so that the rib thereof clears the bottom of said tongue clearance spaces.

7. A metal working machine comprising a slitting and shearing device, a bending device including oppositely working bending elements, and separate connections between said slitting and shearing device and said bending device for operating the bending elements in opposite directions.

8. A metal working machine comprising a slitting and shearing device, a reciprocating ram head associated with said slitting and shearing device, a bender device, upper and lower bending elements mounted to reciprocate in said bending device, a rigid connection between said ram head and said upper bending element, and a bell crank connection between said ram head and said lower bending element.

9. A metal working machine comprising a slitting and shearing device, a reciprocating ram head associated with said slitting and shearing device, a bender device including a frame having guide means, upper and lower bending elements mounted to reciprocate in said guide means, a rigid arm connecting said ram head and said upper bending element, and a bell crank pivoted to the framework of the bender device, and having one of its ends connected to said ram head and the other connected to said lower bending element.

10. A metal working machine comprising a slitting and shearing device, a bending device including reciprocating bending elements, connections between said slitting and shearing device and said bender device for operating the reciprocating elements of the latter, means for feeding a metal sheet to said slitting and shearing device, and means for delivering the sheet from the bending device after being operated upon by the bending elements thereof.

In testimony whereof we hereunto affix our signatures in the presence of two witnesses.

JOSEPH G. HUBBARD.
WILLIAM R. WILSON.

Witnesses:
  HORACE T. SMITH,
  W. P. WIEGERING.